(12) United States Patent
Yin et al.

(10) Patent No.: US 10,374,819 B2
(45) Date of Patent: Aug. 6, 2019

(54) METHODS AND DEVICES OF ACCESSING WIRELESS NETWORK

(71) Applicant: Xiaomi Inc., Beijing (CN)

(72) Inventors: Mingjun Yin, Beijing (CN); Deguo Meng, Beijing (CN); Ziguang Gao, Beijing (CN)

(73) Assignee: XIAOMI INC., Beijing (CN)

( * ) Notice: Subject to any disclaimer, the term of this patent is extended or adjusted under 35 U.S.C. 154(b) by 315 days.

(21) Appl. No.: 14/834,438

(22) Filed: Aug. 25, 2015

(65) Prior Publication Data

US 2016/0087811 A1 Mar. 24, 2016

Related U.S. Application Data

(63) Continuation of application No. PCT/CN2015/074875, filed on Mar. 23, 2015.

(30) Foreign Application Priority Data

Sep. 19, 2014 (CN) .......................... 2014 1 0484650

(51) Int. Cl.
*H04L 12/18* (2006.01)
*H04W 48/16* (2009.01)
*H04W 48/18* (2009.01)
*H04W 88/04* (2009.01)

(52) U.S. Cl.
CPC .......... *H04L 12/189* (2013.01); *H04W 48/16* (2013.01); *H04W 48/18* (2013.01); *H04W 88/04* (2013.01)

(58) Field of Classification Search
None
See application file for complete search history.

(56) References Cited

U.S. PATENT DOCUMENTS

| 6,970,449 B1 * | 11/2005 | Smith .................. H04L 12/189 370/349 |
| 2008/0112350 A1 | 5/2008 | Nanda et al. |
| 2009/0252165 A1 | 10/2009 | Zhang et al. |

(Continued)

FOREIGN PATENT DOCUMENTS

| CN | 101340334 A | 1/2009 |
| CN | 103297299 A | 9/2013 |

(Continued)

OTHER PUBLICATIONS

"International Search Report for PCT/CN2015/074875".
Extended European Search Report of EP 15185495.7.
International Search Report of PCT/CN2015/074875.

*Primary Examiner* — Adnan Baig
(74) *Attorney, Agent, or Firm* — Jun He Law Offices P.C.; James J. Zhu

(57) ABSTRACT

The present disclosure relates to methods and devices of accessing a wireless network. The method of accessing a wireless network in a first terminal device includes: detecting a target terminal device waiting access a target wireless network after the first terminal device accesses the target wireless network; generating a plurality of multicast addresses according to access information of the target wireless network; and sending a multicast packet to each of the plurality of multicast addresses, wherein the multicast packet is indicative of the access information and is received by the target terminal device so as to access the target wireless network.

12 Claims, 9 Drawing Sheets

(56) References Cited

U.S. PATENT DOCUMENTS

| | | | | |
|---|---|---|---|---|
| 2010/0197275 A1* | 8/2010 | Yamasaki | ............. | H04L 12/585 |
| | | | | 455/411 |
| 2011/0248867 A1* | 10/2011 | Lee | ...................... | G08G 1/0104 |
| | | | | 340/905 |
| 2014/0226817 A1 | 8/2014 | Von Huben et al. | | |
| 2015/0009862 A1* | 1/2015 | Zhang | ................... | H04B 5/0031 |
| | | | | 370/254 |
| 2015/0181505 A1* | 6/2015 | Deng | .................... | H04W 48/10 |
| | | | | 713/160 |
| 2015/0208451 A1* | 7/2015 | Tzoreff | ................. | H04W 76/14 |
| | | | | 370/329 |
| 2015/0245377 A1* | 8/2015 | Lee | ..................... | H04W 40/244 |
| | | | | 370/329 |
| 2016/0212692 A1* | 7/2016 | Lee | ....................... | H04W 48/14 |

FOREIGN PATENT DOCUMENTS

| | | |
|---|---|---|
| CN | 103327644 A | 9/2013 |
| CN | 103379010 A | 10/2013 |
| CN | 103581876 A | 2/2014 |
| CN | 104038984 A | 9/2014 |
| CN | 104378801 A | 2/2015 |
| JP | 2011525313 A | 9/2011 |
| JP | 2013530601 A | 7/2013 |
| JP | 2013247532 A | 12/2013 |
| JP | 2013255059 A | 12/2013 |
| KR | 1020050101110 A | 10/2005 |
| KR | 100684166 B1 | 2/2007 |
| KR | 20070121280 A | 12/2007 |
| WO | 2011139962 A1 | 11/2011 |
| WO | 2013130851 A1 | 2/2013 |

\* cited by examiner

METHODS AND DEVICES OF ACCESSING WIRELESS NETWORK

CROSS-REFERENCE TO RELATED APPLICATIONS

The present application is a Continuation of International Application No. PCT/CN2015/074875, filed on Mar. 23, 2015, which is based upon and claims priority to Chinese Patent Application No. 201410484650.8, filed on Sep. 19, 2014, the entire contents of which are incorporated herein by reference.

TECHNICAL FIELD

The present disclosure relates to a field of communication technology, and more particularly, to methods and devices of accessing a wireless network.

BACKGROUND

In a wireless network environment provided by a wireless AP (Access Point, wireless access point) device, a terminal device may be connected to the wireless AP device, so that the terminal device may access a public network through that wireless AP device. For example, in a home wireless network environment, the common wireless AP device is a router arranged in the household, any kind of smart terminal devices with a WIFI (Wireless Fidelity) access function may access the home wireless network in the household, and thus the interconnection between the smart terminal devices may be realized.

In the related art, in an implementation, when the smart terminal devices within the same wireless network range wish to join the wireless network, one of the smart terminal devices that has accessed the wireless network may be disconnected from the wireless network and may accessed other smart terminal devices in the AP mode, then sends access information of the wireless network to other smart terminal devices, and other smart terminal devices access the wireless network according to the access information. The smart terminal device that has been disconnected will accesses the wireless network again, thereby realizing that all smart terminal devices access the wireless network.

However, during the above described process of accessing the wireless network, the smart terminal device that have accessed the wireless network need to make an access switch, and thus the access process becomes cumbersome and inefficient.

SUMMARY

According to a first aspect of the embodiments of the present disclosure, there is provided a method of accessing a wireless network in a first terminal device. The method includes: detecting a target terminal device waiting to access a target wireless network after a first terminal device accesses the target wireless network; generating a plurality of multicast addresses according to access information of the target wireless network; and sending a multicast packet to each of the plurality of multicast addresses, wherein the multicast packet is indicative of the access information and is received by the target terminal device so as to access the target wireless network.

According to a second aspect of the embodiments of the present disclosure, there is provided another method of accessing a wireless network in a target terminal device. The method includes: receiving a physical layer packet carrying a multicast packet sent from a first terminal device that has accessed a target wireless network, wherein a multicast address of the multicast packet is one of a plurality of multicast addresses constructed by the first terminal device according to access information of the target wireless network; obtaining the access information of the target wireless network according to the multicast packet; and accessing the target wireless network according to the access information.

According to a third aspect of the embodiments of the present disclosure, there is provided a first terminal device. The first terminal device includes: a processor; and a memory for storing instructions executable by the processor; wherein the processor is configured to perform: detecting a target terminal device waiting to access a target wireless network after the first terminal device accesses the target wireless network; generating a plurality of multicast addresses according to access information of the target wireless network; and sending a multicast packet to each of the plurality of multicast addresses, wherein the multicast packet is indicative of the access information and is received by the target terminal device so as to access the target wireless network.

According to a fourth aspect of the embodiments of the present disclosure, there is provided a target terminal device. The target terminal device includes a processor; and a memory for storing instructions executable by the processor; wherein the processor is configured to perform: receiving a physical layer packet carrying a multicast packet sent from a first terminal device that has accessed a target wireless network, wherein a multicast address of the multicast packet is one of a plurality of multicast addresses constructed by the first terminal device according to access information of the target wireless network; obtaining the access information of the target wireless network according to the multicast packet; and accessing the target wireless network according to the access information.

Accordingly, the present disclosure detects the target terminal device waiting to access the target wireless network by the first terminal device that has accessed the target wireless network, and sends the multicast packet to the target terminal device according to the multicast address after generating the multicast address according to the access information of the target wireless network, so that the target terminal device obtains the access information according to the received multicast packet and accesses the target wireless network. Since it may be realized that the target terminal device accesses the target wireless network in the case that the first terminal device is not disconnected from the target wireless network, as compared with the related art that the access switch need to be made, the access control process may be simplified, and the efficiency that the target terminal device accesses the target wireless network is improved.

In the present disclosure, the first terminal device may receive the beacon packet sent by the target terminal device through the set AP scan interface, whereby it may be realized that the target terminal device is automatically found according to the terminal device information carried in the beacon packet.

In the present disclosure, the first terminal device may use different detect manners to detect the target terminal device according to the terminal device information, and thus the diverse and flexible detecting manners may satisfy the user's different setting requirements.

In the present disclosure, the first terminal device may encrypt the access information before the access information of the target wireless network is transmitted, whereby the transport security of the access information is ensured.

In the present disclosure, the first terminal device may construct the MAC address carrying the access information of the target wireless network, and map the MAC address to the corresponding multicast address according to the mapping relationship between the MAC address and the multicast address in the related art.

In the present disclosure, since the target terminal device itself has a broadcast function of the beacon packet, thus it makes that the first terminal device may automatically detect the target terminal device by receiving the beacon packet in the meantime that the connection to the target wireless network is not disconnected.

In the present disclosure, since the target terminal device may receive all air interface packets in the listening mode, after the listening mode starts, the multicast packet sent by the first terminal device may be received, so that the access information of the target wireless network is obtained, and the automatic access to the target wireless network is realized.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Term used in the present disclosure is merely for the purpose of describing particular embodiments, and not intended to limit the present disclosure. As used in the present disclosure and the appended claims, "an", "said" and "the" in singular forms are intended to include plural forms, unless the context definitely indicates otherwise. It should also be understood that the term "and/or" used herein means and includes any or all possible combinations of one or more of the associated listed items.

It should be understood that, although the terms "first", "second", "third", etc., are used in the present disclosure to describe a variety of information, but the information should not be limited by these terms. These terms are merely used to distinguish information of one type. For example, without departing from the scope of the present disclosure, the first information may also be referred to as the second information. Similarly, the second information may also be referred to as the first information. Depending on the context, as used herein, the word "if" may be interpreted as "where" or "when" or "in response to".

Figure 1:
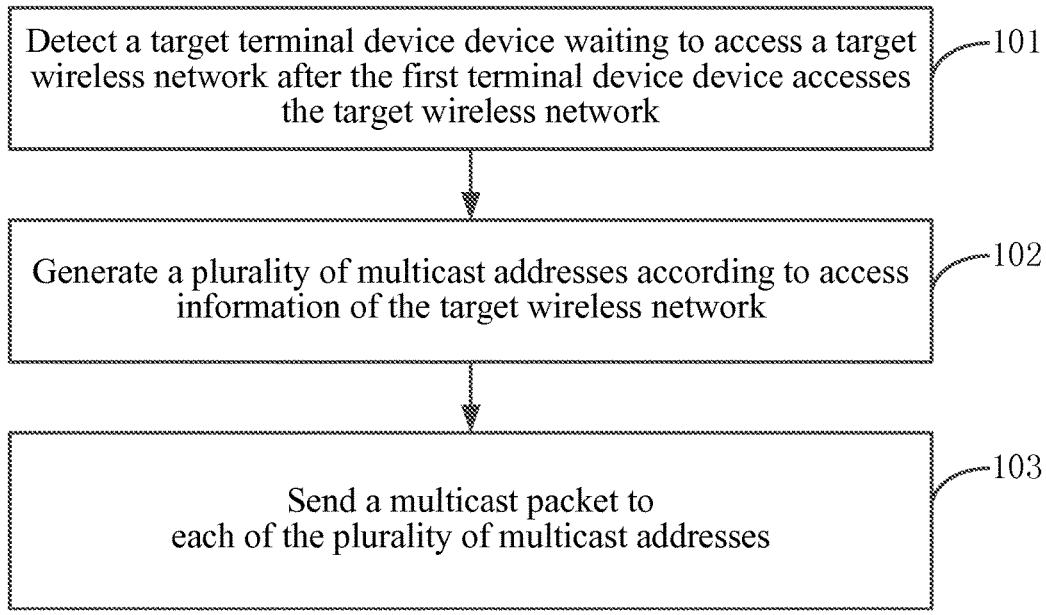
FIG. 1 is a flow chart showing a method of accessing a wireless network according to an exemplary embodiment of the present disclosure.

As shown in FIG. 1, FIG. 1 is a flow chart showing a method of accessing a wireless network according to an exemplary embodiment of the present disclosure, the method may be used in a first terminal device. The method includes the following steps.

In step 101, a target terminal device waiting to access a target wireless network is found after a first terminal device accesses the target wireless network.

The terminal device of the embodiments of the present disclosure may be any smart terminal devices with a wireless network access function such as WIFI function, which may specifically be a mobile phone, a tablet, a PDA (Personal Digital Assistant), a smart socket, a smart air conditioner, a smart air purifier, a smart wearable device, a WIFI infrared remote relay box, and the like. The smart terminal device may usually include two working modes, respectively an AP mode and a STATION mode. In the AP mode, the smart terminal device may be used as a wireless access point, and provide an access network service to other smart terminal devices. In the STATION mode, the smart terminal device used as a client device accesses a network through other AP devices.

In the embodiments of the present disclosure, a target wireless network is provided by a router used as an AP device, and the router used as a smart routing device may not only have a traditional routing function, but also further include a separate operating system and a disk. Access information of the target wireless network may be obtained when the first terminal device accesses the target wireless network, and may include a SSID (Service Set Identifier) and a password. In the range of the target wireless network provided by the router, in addition to the accessed first terminal device, it may also set several smart terminal devices that have not accessed the target wireless network, which may be referred as a target terminal device in the embodiments of the present disclosure.

In the embodiments of the present disclosure, smart terminal devices that have set the AP mode may be referred as the second terminal devices. It should be noted that, the description of the second terminal devices is not used to limit the number of the terminal devices, but represents at least one smart terminal device of all smart terminal devices that can be found by the first terminal device. In the AP mode, the second terminal devices may broadcast a beacon packet in a preset time period, wherein the beacon packet may carry terminal device information of the second terminal devices. For example, the terminal device information may include a SSID of the second terminal devices, a device type description information and a terminal device manufacturer information and the like, and may also include an IP address for verification, so as to verify whether the second terminal device verification is successfully connected, for example, automatically jump to a page corresponding to the IP address and the like when the connection is successful. As a smart terminal device, the first terminal device (for example, a router or a mobile phone that has been connected with the router, and the like) provides an AP scan interface, and by calling the AP scan interface, the first terminal device may receive a beacon packet broadcasted by the second terminal devices, and obtain the terminal device information of the second terminal devices from the beacon packet, so that the target terminal device is acquired from the second terminal devices according to the terminal device information. Since the second terminal devices that may be found by the first terminal device may include the AP device in a range of other wireless network in addition to the target terminal devices in a range of the target wireless network, after the second terminal device is found by the first terminal device, it is required to further acquire the target terminal device waiting to access the target wireless network from the second terminal devices. The target terminal device is acquired in the following manners.

A first manner: when obtaining the terminal device information of the second terminal device from the beacon packet, the first terminal device may output an information list containing the terminal device information of each second terminal device. In this case, a terminal device user of the first terminal device may select target terminal device information according to the terminal device information in the information list. For example, in a range of a home target wireless network, the terminal device user of the first terminal device may select the terminal device information of the terminal device set in the household from the information list as the target terminal device information, and correspondingly, the terminal device corresponding to the target terminal device information is the target terminal device.

A second manner: every time the first terminal device detect the target terminal device and the target terminal device accesses the target wireless network, the terminal device information of the above target terminal device is recorded in a history terminal device list; when obtaining the terminal device information of the second terminal device from the beacon packet, the first terminal device may detect the history terminal device list according to the terminal device information of the second terminal device, and determine the second terminal device corresponding to the terminal device information found from the history terminal device information as the target terminal device.

A third manner: the first terminal device may preset a corresponding relationship between the target terminal device list and a time condition, wherein, the time condition may be used to represent a time range, for example, from 20:00 pm to 24:00 pm, the target terminal device list includes the terminal device information of the terminal device allowed to access the target wireless network in a range of time represented by the time condition; when obtaining the terminal device information of the second terminal device from the beacon packet, the first terminal device may firstly determine whether a current time satisfies a preset time condition, detects the target terminal device list according to the terminal device information of the second terminal device when the time condition is satisfied, and determines the second terminal device corresponding to the terminal device information found from the target terminal device list as the target terminal device.

Certainly, the selection manner of the target terminal device from the second terminal device is not limited to the above manner, and may be determined according to the environmental consideration, for example, whether the smart air conditioner is accessed is selected according to a current air temperature and the like.

In order to improve the accuracy of detecting the second terminal devices, after the terminal device information of the second terminal devices is obtained from the beacon packet, the first terminal device may send a verification packet, such as a probe packet, to the second terminal device, and acquire the target terminal device from the second terminal devices which send the response packet when receiving the response packet of the verification packet.

In step 102, a plurality of multicast addresses are generated according to access information of the target wireless network.

The SSID and the password of the target wireless network obtained by the first terminal device compose a string, and the embodiments of the present disclosure do not limit a composition format of the string. For example, the string may be a format of "SSID+password", and may also be a format of "password+SSID". The first terminal device encrypts the above string, and obtains an encrypted character string, and the embodiments of the present disclosure are not limited to the specific encryption manner. A symmetric encryption algorithm may be used, and an asymmetric cryptographic algorithm may also be used. In order that the target terminal device obtains the access information of the target wireless network according to the encrypted character string, a corresponding encryption and decryption algorithm may be pre-configured in the first terminal device and the target terminal device, or the corresponding encryption and decryption algorithm may be configured by way of a packet negotiation, so that both side terminal devices may encrypt and decode the string composed by the access information according to the same encryption and decryption algorithm.

The above encrypted character string is usually composed by several byte contents, the first terminal device may construct a plurality of destination MAC (Media Access Control) addresses, each of which may be used to carry at least one byte content. In an example, the first terminal device may construct a destination MAC address for each byte content, the byte content is written in the property (value) byte of the destination MAC address (for example, the last one byte of the MAC address), location information of the byte content in the encrypted character string is written in an index byte of the destination MAC address (for example, the second byte counted backwards of the MAC address). For example, according to an order from left to right and the byte contents composing the encrypted character string, an index number starting at 1 is set for the byte content as the location information of each byte content, the corresponding byte content may be combined into the encrypted character string according to the order of the index number from small to large.

In the embodiments of the present disclosure, the first terminal device may send the encrypted character string to the target terminal device by sending a multicast packet. Since the multicast packet is three layers IP (Internet Protocol) packet and transmitted by TCP (Transmission Control Protocol)/IP and a multicast address thereof corresponds to an IP address, after a plurality of destination MAC addresses are constructed, the first terminal device may generate a plurality of multicast addresses for the plurality of destination MAC addresses according to a mapping relationship in the related art between the MAC address and the multicast address. Herein, the multicast packet may specifically be an IGMP (Internet Group Management Protocol) packet.

In step 103, a multicast packet is sent to each of the plurality of multicast addresses, wherein the multicast packet is indicative of the access information and is received by the target terminal device so as to access the target wireless network.

In the embodiments of the present disclosure, the target terminal device waiting to access the target wireless network may start a listening mode. In the listening mode, all packets transmitted through an air interface may be received, and thus the multicast packet sent by the first terminal device to the target terminal device according to the multicast address may be listened by the target terminal device, whereby the access information of the target wireless network may be obtained from the multicast packet, realizing the access to the target wireless network. In one exemplary embodiment, the multicast packet consists of the multicast address and an empty packet body. Because the multicast address itself is embedded with the access information, the target terminal device may obtain the access information by only parsing the multicast address.

By applying the above embodiments, since it may be realized that the target terminal device accesses the target wireless network in the case that the first terminal device is not disconnected from the target wireless network, as compared with the related art that the access switch need to be made, the access control process may be simplified, and the efficiency that the target terminal device accesses the target wireless network is improved.

Figure 2:
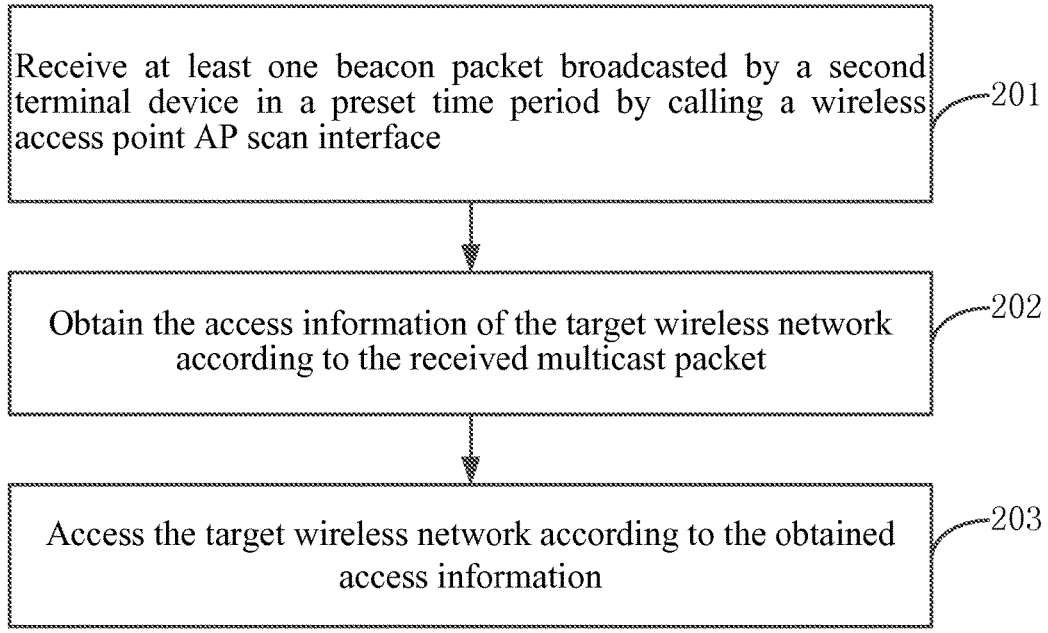
FIG. 2 is a flow chart showing another method of accessing a wireless network according to an exemplary embodiment of the present disclosure.

As shown in FIG. 2, FIG. 2 is a flow chart showing another method of accessing a wireless network according to an exemplary embodiment of the present disclosure, which may be used in a target terminal device. The method includes the following steps.

In step 201, a physical layer packet carrying a multicast packet sent by a first terminal device that has accessed a target wireless network is received, a multicast address of the multicast packet is one of the plurality of multicast addresses constructed by the first terminal device according to access information of the target wireless network.

In the embodiments of the present disclosure, the target terminal device waiting to access the target wireless network may be set in an AP mode. In the AP mode, the target terminal device may broadcast a beacon packet in a preset time period, the beacon packet may carry the terminal device information of the target terminal device, for example, a SSID of the target terminal device, device type description information and terminal device manufacturer information and the like, and may also include an IP address used for verifying, for example, so as to automatically jump to a page corresponding to the IP address when verifying the second terminal device verification is successfully connected. The first terminal device may detect the target terminal device by receiving the beacon packet, and may determine that the target terminal device is a terminal device waiting to access the target wireless network according to the terminal device information carried in the beacon packet. The specific processes that the first terminal device detects the target terminal device may refer to the corresponding descriptions of the embodiments in FIG. 1, which are not further described herein.

In the embodiments of the present disclosure, the target terminal device may start a listening mode. In the listening mode, the target terminal device may listen all packets transmitted through an air interface. Therefore, when the first terminal device determines that there is a terminal device which wants to access the target wireless network, the first terminal device will construct a plurality of multicast addresses according to the access information of the target wireless network, and sends a multicast packet to each of the plurality of multicast addresses. At this time, the target terminal device in the listening mode may listen the multicast packet via the air interface. In the listening mode, the beacon packet may be periodically broadcasted at the same time.

In addition, since the target terminal device may receive various packets via the air interface, the multicast packet sent by the first terminal device may be obtained by identifying a packet feature, wherein, the packet feature may be a packet protocol. For example, when multicast packet is an IGMP packet, if the target terminal device identifies that the packet protocol is an IGMP protocol, it may be determined that the received multicast packet is a multicast packet sent by the first terminal device.

In step 202, the access information of the target wireless network is obtained according to the multicast packet.

In the embodiments of the present disclosure, after receiving a physical layer packet carrying a multicast packet, for example, 802.11 packet and the like, the target terminal device may acquire a MAC address of the physical layer packet, and then acquire a data area in the MAC address corresponding to the multicast address sent by the first terminal device according to a mapping relationship between the MAC address and the multicast address. A value byte in the data area of the MAC address is read to obtain a byte content, and an index byte in the data area of the MAC address is read to obtain location information of the byte content, The byte content is combined to obtain an encrypted character string according to the location information, and the encrypted character string is decoded to obtain a SSID and a password of the target wireless network as the access information.

Referring to the process in FIG. 1, the first terminal device generates the encrypted character string and the byte contents of the encrypted character string are carried by the MAC address. When the target terminal device obtains the corresponding MAC address carrying the multicast address, the value byte in the data area of the MAC address is read to obtain the byte contents, and the index byte in the data area of the MAC address is read to obtain location information of the byte content. The byte content is combined to obtain an encrypted character string according to the location information. Then, the target terminal device may decode the encrypted character string according to an encryption algorithm which is consistent with that set at the first terminal device, to obtain access information of the target wireless network. The access information includes a SSID and a password of the target wireless network.

In step 203, the target wireless network is accessed according to the access information.

By applying the above embodiments, since it may be realized that the target terminal device accesses the target wireless network in the case that the first terminal device is not disconnected from the target wireless network, as compared with the related art that the access switch need to be made, the access control process may be simplified, and the efficiency that the target terminal device accesses the target wireless network is improved.

Figure 3:
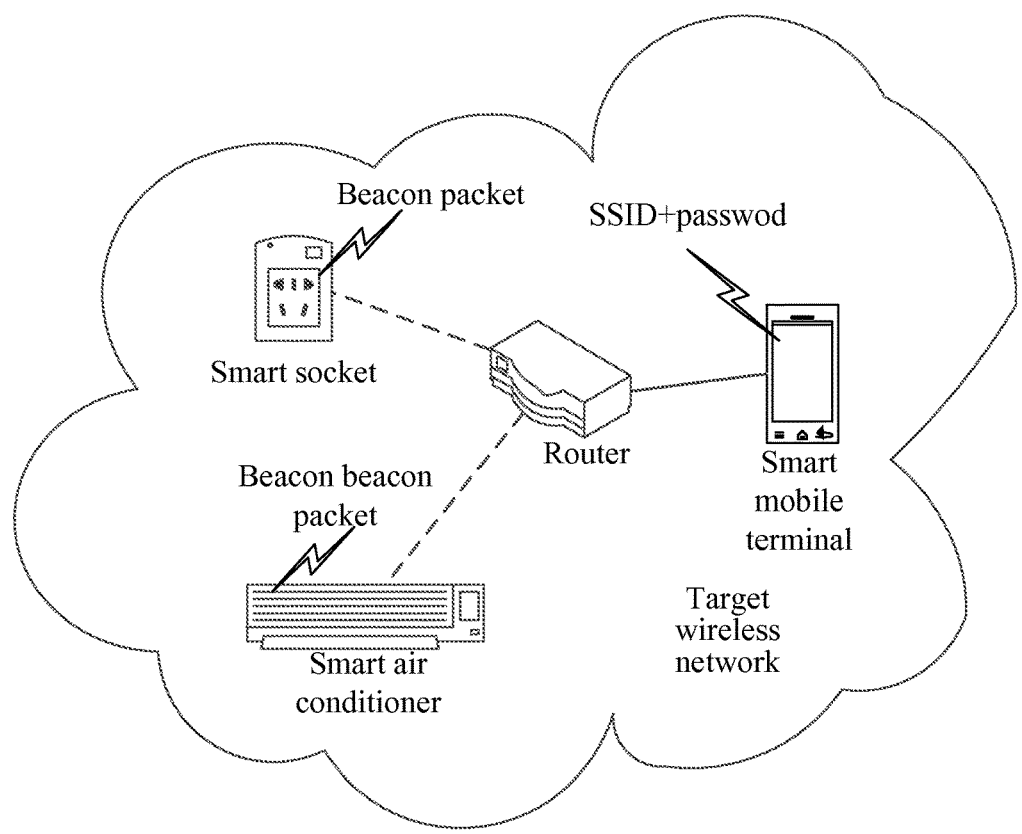
FIG. 3 is a diagram showing an application scene of accessing a wireless network according to an exemplary embodiment of the present disclosure.

Referring to FIG. 3, FIG. 3 is a diagram showing an application scene of accessing a wireless network according to an exemplary embodiment of the present disclosure.

FIG. 3 shows a home wireless network scene, in which a home router is arranged. The target wireless network may be provided by the router, so that a smart terminal device in the household may realize the access to the public network by accessing the target wireless network. As shown in FIG. 3, the smart terminal device shown in the household scene may comprise: a smart mobile phone, a smart socket and a smart air conditioner.

At the start time, the smart mobile phone accesses the target wireless network. Suppose that the SSID of the target wireless network obtained by the smart mobile phone is "Xiaomi_10ED_5G", the password is "123456".

In the household scene, in addition to the smart mobile phone, other smart devices broadcast the beacon packet in the AP mode, the beacon packet carries the terminal device information of the smart terminal device. Taking the smart socket as an example, the beacon packet broadcasted by the smart socket carries its SSID "xiaomi_plug_v1_pro555D". The smart mobile phone receives the beacon packet sent by the smart terminal device by calling the AP scan interface, and detects all smart sockets and smart air conditioners waiting to access the target wireless network in the household by identifying the information carried in the beacon packet.

After the above smart sockets and smart air conditioners are found, the smart mobile phone may encrypt the SSID and the password "Xiaomi_10ED 5G+123456" of the target wireless network, and construct a multicast address, and then send the multicast packet to the target terminal device according to the multicast address. The processes may refer to the corresponding descriptions of the embodiments in FIG. 1 and FIG. 2, which are not further described herein.

The above smart sockets and smart air conditioners, are in a listening mode while broadcasting the beacon packet. A destination MAC address is obtained through a multicast address when listening to the multicast packet transmitted by the air interface, so as to obtain the SSID and the password of the target wireless network carried in the destination MAC address, thereby accessing the target wireless network. The specific processes may refer to the corresponding descriptions of the embodiments in FIG. 1 and FIG. 2, which are not further described herein.

In the home wireless network scene shown in FIG. 3, since the smart mobile phone may realize that the smart socket and the smart air conditioner automatically access the home router in the case that the wireless connection to the home router is not disconnected, the process that the smart terminal devices uniformly access the target wireless network in the household scene is optimized, the access control process is simple, and the access efficiency is high.

Corresponding to the aforesaid method embodiment of accessing the wireless network, the present disclosure also provides the embodiments of an apparatus of accessing a wireless network and a terminal device thereof.

Figure 4:
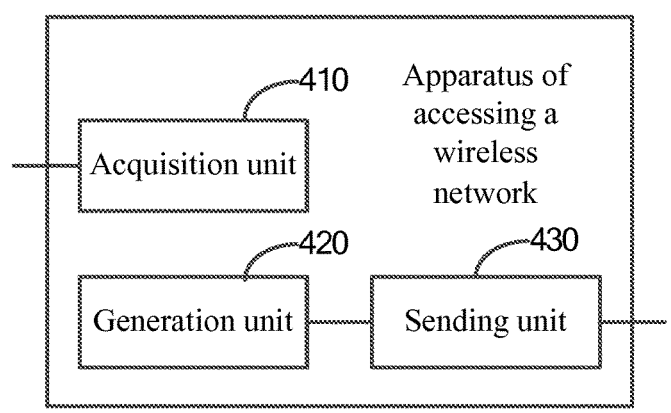
FIG. 4 is a block diagram showing an apparatus of accessing a wireless network according to an exemplary embodiment of the present disclosure.

As shown in FIG. 4, FIG. 4 is a block diagram showing an apparatus of accessing a wireless network according to an exemplary embodiment of the present disclosure. The apparatus includes: an acquisition unit 410, a generation unit 420 and a sending unit 430.

Herein, the acquisition unit 410 is configured to detect a target terminal device waiting to access a target wireless network after a first terminal device accesses the target wireless network.

The generation unit 420 is configured to generate a plurality of multicast addresses according to access information of the target wireless network.

The sending unit 430 is configured to send a multicast packet to each of the plurality of multicast addresses, wherein the multicast packet is indicative of the access information and is received by the target terminal device so as to access the target wireless network.

By applying the above embodiments, since it may be realized that the target terminal device accesses the target wireless network in the case that the first terminal device is not disconnected from the target wireless network, as compared with the related art that the access switch need to be made, the access control process may be simplified, and the efficiency that the target terminal device accesses the target wireless network is improved.

Figure 5:
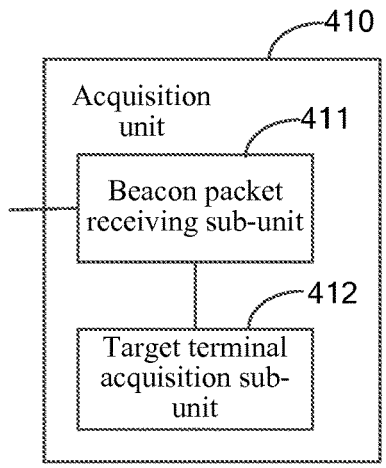
FIG. 5 is a block diagram showing another apparatus of accessing a wireless network according to an exemplary embodiment of the present disclosure.

As shown in FIG. 5, FIG. 5 is a block diagram showing another apparatus of accessing a wireless network according to an exemplary embodiment of the present disclosure, which is based on the embodiment shown in aforesaid FIG. 4. The acquisition unit 410 may include: a beacon packet receiving sub-unit 411 and a target terminal device acquisition sub-unit 412.

Herein, the beacon packet receiving sub-unit 411 is configured to receive at least one beacon packet broadcasted by a second terminal device in a preset time period by calling an AP scan interface, wherein the beacon packet carries terminal device information of the second terminal device.

The target terminal device acquisition sub-unit 412 is configured to acquire the target terminal device from the second terminal device according to the terminal device information.

By applying the above embodiments, the first terminal device may receive the beacon packet sent by the target terminal device through the set AP scan interface, whereby it may be realized that the target terminal device is automatically found according to the terminal device information carried in the beacon packet.

Figure 6A:
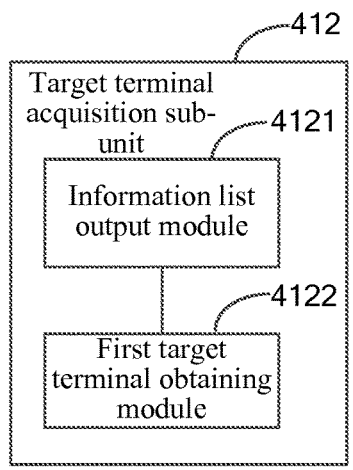
FIG. 6A is a block diagram showing another apparatus of accessing a wireless network according to an exemplary embodiment of the present disclosure.

FIG. 6A is a block diagram showing another apparatus of accessing a wireless network according to an exemplary embodiment of the present disclosure which is based on the embodiment shown in aforesaid FIG. 5. The target terminal device acquisition sub-unit 412 may include: an information list output module 4121 and a first target terminal device obtaining module 4122.

Herein, the information list output module 4121 is configured to output an information list containing the terminal device information of the second terminal device.

The first target terminal device obtaining module 4122 is configured to obtain target terminal device information selected by a user from the information list, wherein the target terminal device information is the terminal device information of the target terminal device.

Figure 6B:
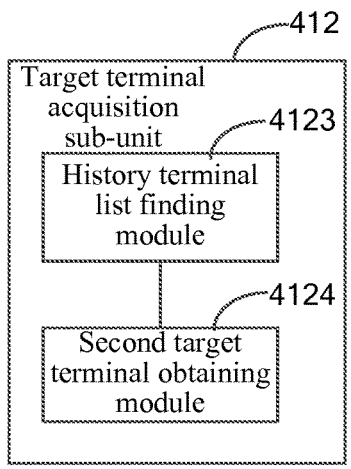
FIG. 6B is a block diagram showing another apparatus of accessing a wireless network according to an exemplary embodiment of the present disclosure.

FIG. 6B is a block diagram showing another apparatus of accessing a wireless network according to an exemplary embodiment of the present disclosure which is based on the embodiment shown in aforesaid FIG. 5. The target terminal device acquisition sub-unit 412 may include: a history terminal device list detecting module 4123 and a second target terminal device obtaining module 4124.

Herein, the history terminal device list detecting module 4123 is configured to detect a recorded history terminal device list according to the terminal device information of the second terminal device, wherein the history terminal device list contains terminal device information of a terminal device found by the first terminal device last time and accessed the target wireless network.

The second target terminal device obtaining module 4124 is configured to determine the second terminal device corresponding to the terminal device information found from the history terminal device information as the target terminal device.

Figure 6C:
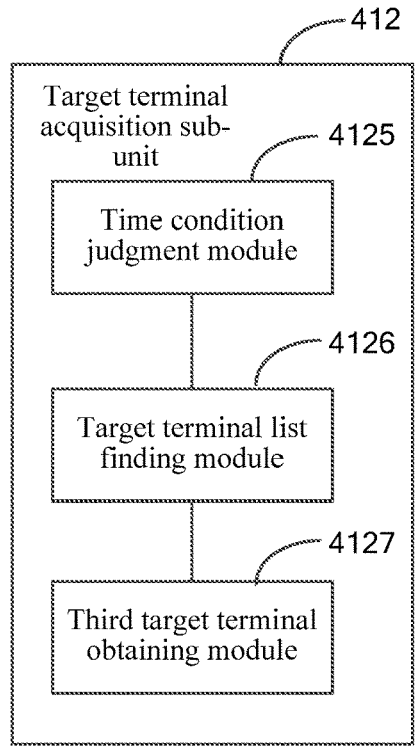
FIG. 6C is a block diagram showing another apparatus of accessing a wireless network according to an exemplary embodiment of the present disclosure.

FIG. 6C is a block diagram showing another apparatus of accessing a wireless network according to an exemplary embodiment of the present disclosure which is based on the embodiment shown in aforesaid FIG. 5. The target terminal device acquisition sub-unit 412 may include: a time condition judgment module 4125, a target terminal device list detecting module 4126 and a third target terminal device obtaining module 4127.

Herein, the time condition judgment module 4125 is configured to determine whether a current time satisfies a preset time condition.

The target terminal device list detecting module 4126 is configured to detect a preset target terminal device list according to the terminal device information of the second terminal device when the time condition is satisfied, wherein the target terminal device list contains terminal device information of a terminal device permitted to access the target wireless network under the time condition.

The third target terminal device obtaining module 4127 is configured to determine the second terminal device corresponding to the terminal device information found from the target terminal device list as the target terminal device.

Figure 6D:
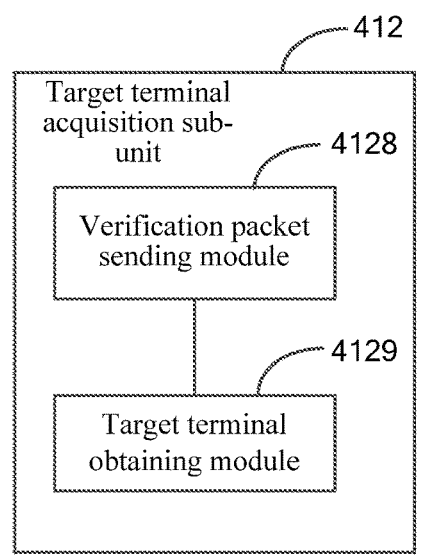
FIG. 6D is a block diagram showing another apparatus of accessing a wireless network according to an exemplary embodiment of the present disclosure.

FIG. 6D is a block diagram showing another apparatus of accessing a wireless network according to an exemplary embodiment of the present disclosure which is based on the embodiment shown in aforesaid FIG. 5. The target terminal device acquisition sub-unit 412 may include: a verification packet sending module 4128 and a target terminal device obtaining module 4129.

Herein, the verification packet sending module 4128 is configured to send a verification packet to the second terminal device.

The target terminal device obtaining module 4129 is configured to acquire the target terminal device from the second terminal device sending a response packet after receiving the response packet of the verification packet.

By applying the above embodiments, the first terminal device may use different detect manners to detect the target terminal device according to the terminal device information, thus the diverse and flexible detect manners may satisfy the user's the different setting requirements.

Figure 7:
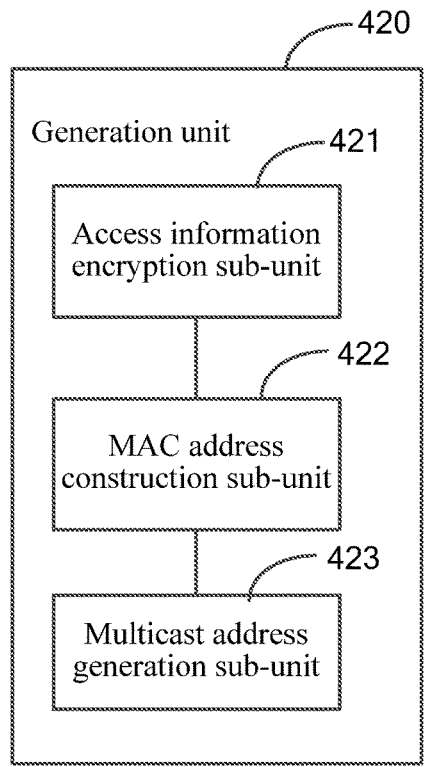
FIG. 7 is a block diagram showing another apparatus of accessing a wireless network according to an exemplary embodiment of the present disclosure.

FIG. 7 is a block diagram showing another apparatus of accessing a wireless network according to an exemplary embodiment of the present disclosure which is based on any one of the embodiments shown in aforesaid FIG. 4 to FIG. 6D. The generation unit 420 may include: access information encryption sub-unit 421, a MAC address construction sub-unit 422 and a multicast address generation sub-unit 423.

Herein, the access information encryption sub-unit 421 is configured to encrypt the access information of the target wireless network, and acquire an encrypted character string, the access information includes a service set identifier SSID and a password of the target wireless network.

The MAC address construction sub-unit 422 is configured to construct a plurality of destination MAC addresses according to the encrypted character string, wherein the destination MAC address is used to carry encrypted character string information.

The multicast address generation sub-unit 423 is configured to generate a plurality of multicast addresses for the plurality of destination MAC addresses according to a mapping relationship between the MAC address and the multicast address.

By applying the above embodiments, the first terminal device may encrypt the access information before the access information of the target wireless network is transmitted, whereby the transport security of the access information is ensured.

Figure 8:
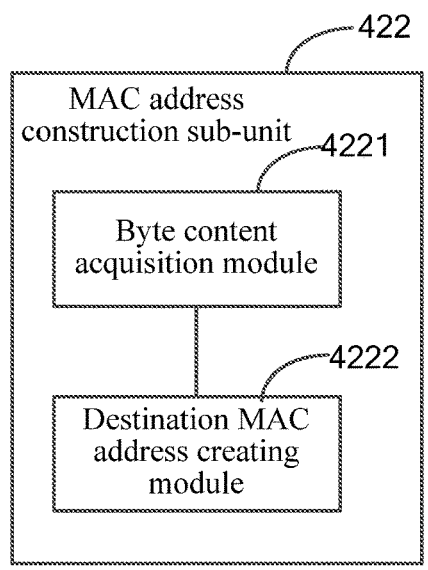
FIG. 8 is a block diagram showing another apparatus of accessing a wireless network according to an exemplary embodiment of the present disclosure.

FIG. 8 is a block diagram showing another apparatus of accessing a wireless network according to an exemplary embodiment of the present disclosure which is based on the embodiment shown in aforesaid FIG. 7. The MAC address construction sub-unit 422 may include: a byte content acquisition module 4221 and a destination MAC address construction module 4222.

The byte content acquisition module 4221 is configured to acquire a byte content of a byte composing the encrypted character string sequentially.

The destination MAC address construction module 4222 is configured to construct a destination MAC address for the byte content, wherein, the byte content is written in a value byte of the destination MAC address, and location information of the byte content in the encrypted character string is written in an index byte of the destination MAC address.

By applying the above embodiments, the first terminal device may construct the MAC address carrying the access information of the target wireless network, and map the MAC address to the corresponding multicast address according to the mapping relationship in the related art between the MAC address and the multicast address.

The apparatus of accessing the wireless network shown in the embodiments of the aforesaid FIG. 4 to FIG. 8 may be applied in the first terminal device that has accessed the target wireless network.

Figure 9:
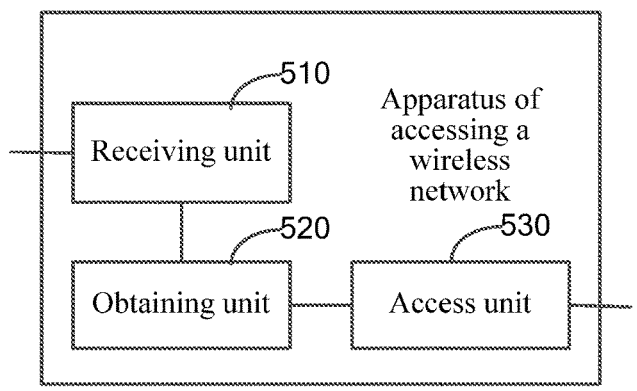
FIG. 9 is a block diagram showing another apparatus of accessing a wireless network according to an exemplary embodiment of the present disclosure.

FIG. 9 is a block diagram showing another apparatus of accessing a wireless network according to an exemplary embodiment of the present disclosure, wherein the apparatus includes: a receiving unit 510, an obtaining unit 520 and an access unit 530.

Herein, the receiving unit 510 is configured to receive a physical layer packet carrying a multicast packet sent from a first terminal device that has accessed a target wireless network, wherein a multicast address of the multicast packet is one of the plurality of multicast addresses constructed by the first terminal device according to access information of the target wireless network.

The obtaining unit 520 is configured to obtain the access information of the target wireless network according to the multicast packet.

The access unit 530 is configured to access the target wireless network according to the access information.

By applying the above embodiments, it may be realized that the target terminal device accesses the target wireless network in the case that the first terminal device is not disconnected from the target wireless network, as compared with the related art that the access switch need to be made, the access control process may be simplified, and the efficiency that the target terminal device accesses the target wireless network is improved.

Figure 10:
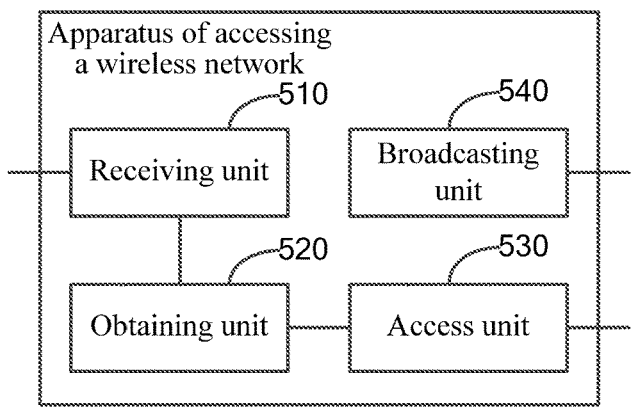
FIG. 10 is a block diagram showing another apparatus of accessing a wireless network according to an exemplary embodiment of the present disclosure.

FIG. 10 is a block diagram showing another apparatus of accessing a wireless network according to an exemplary embodiment of the present disclosure which is based on the embodiment shown in aforesaid FIG. 9. The apparatus may further include: a broadcasting unit 540.

Herein, the broadcasting unit 540 is configured to broadcast a beacon packet in a preset time period, wherein the beacon packet carries terminal device information of a second terminal device, so that the first terminal device selects the second terminal device as a target terminal device according to the terminal device information.

By applying the above embodiments, since the target terminal device itself has a broadcast function of the beacon packet, thus it makes that the first terminal device may automatically detect the target terminal device by receiving the beacon packet in the meantime that the connection to the target wireless network is not disconnected.

Figure 11:
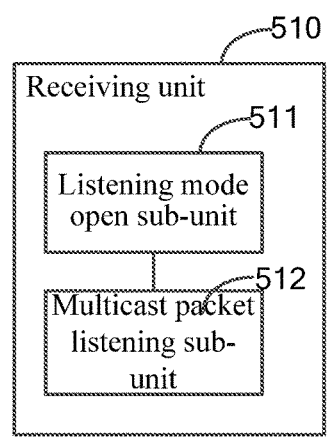
FIG. 11 is a block diagram showing another apparatus of accessing a wireless network according to an exemplary embodiment of the present disclosure.

FIG. 11 is a block diagram showing another apparatus of accessing a wireless network according to an exemplary embodiment of the present disclosure which is based on the embodiment shown in aforesaid FIG. 9 or FIG. 10. The receiving unit 510 may include: a listening mode open sub-unit 511 and a multicast packet listening sub-unit 512.

Herein, the listening mode open sub-unit 511 is configured to start a listening mode.

The multicast packet listening sub-unit 512 is configured to receive a physical layer packet carrying a multicast packet sent from the first terminal device in the listening mode.

By applying the above embodiments, since the target terminal device may receive all air interface packets in the listening mode, the multicast packet sent by the first terminal device may be received after the listening mode starts, whereby the access information of the target wireless network is obtained, and the automatic access to the target wireless network is realized.

Figure 12:
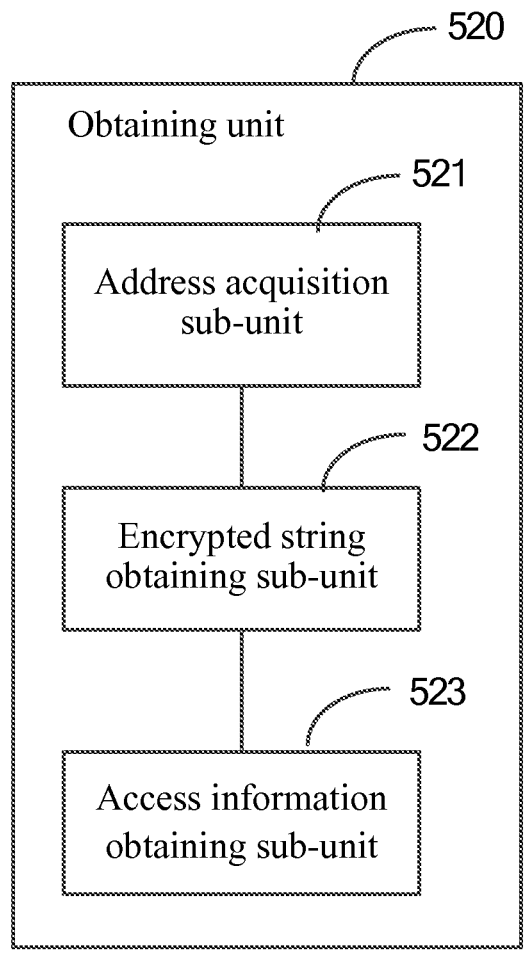
FIG. 12 is a block diagram showing another apparatus of accessing a wireless network according to an exemplary embodiment of the present disclosure.

FIG. 12 is a block diagram showing another apparatus of accessing a wireless network according to an exemplary embodiment of the present disclosure which is based on any one of the embodiments shown in aforesaid FIG. 9 to FIG. 11. The obtaining unit 520 may include: a MAC address acquisition sub-unit 521, an encrypted character string obtain sub-unit 522 and Access information obtain sub-unit 523.

Herein, MAC address acquisition sub-unit 521 is configured to acquire a MAC address of the physical layer packet.

The encrypted character string obtain sub-unit 522 is configured to acquire a data area in the MAC address corresponding to the multicast address sent from the first terminal device according to a mapping relationship between the MAC address and the multicast address; read a value byte in the data area of the MAC address to obtain a byte content, and read an index byte in the data area of the MAC address to obtain location information of the byte content; and combine the byte content according to the location information to obtain an encrypted character string.

The access information obtain sub-unit 523 is configured to decode the encrypted character string to obtain a SSID and a password of the target wireless network as the access information.

The apparatus of accessing the wireless network shown in the embodiments of the aforesaid FIG. 9 to FIG. 12 may be applied in the target terminal device of accessing the target wireless network by the first terminal device that has accessed the target wireless network.

The specific realization processes of the function and arrangement of each unit in the above apparatus may refer to the realization processes corresponding to the steps in the above methods, which are not further described herein.

Since the apparatus embodiment basically corresponds to the method embodiment, the relevant contents may refer to the descriptions in the method embodiment. The apparatus embodiment described above is only schematically, wherein the unit described as a separating component may be or may also not be physically separated, the component used as a cell display may be or may also not be a physical unit, i.e., it may be located in one place, or may also be distributed to a plurality of network units. Some or all of the modules may be selected to realize the purpose of the present disclosure solution according to the actual needs. Those skilled in the art may understand and implement the present disclosure without any creative labor.

Figure 13:
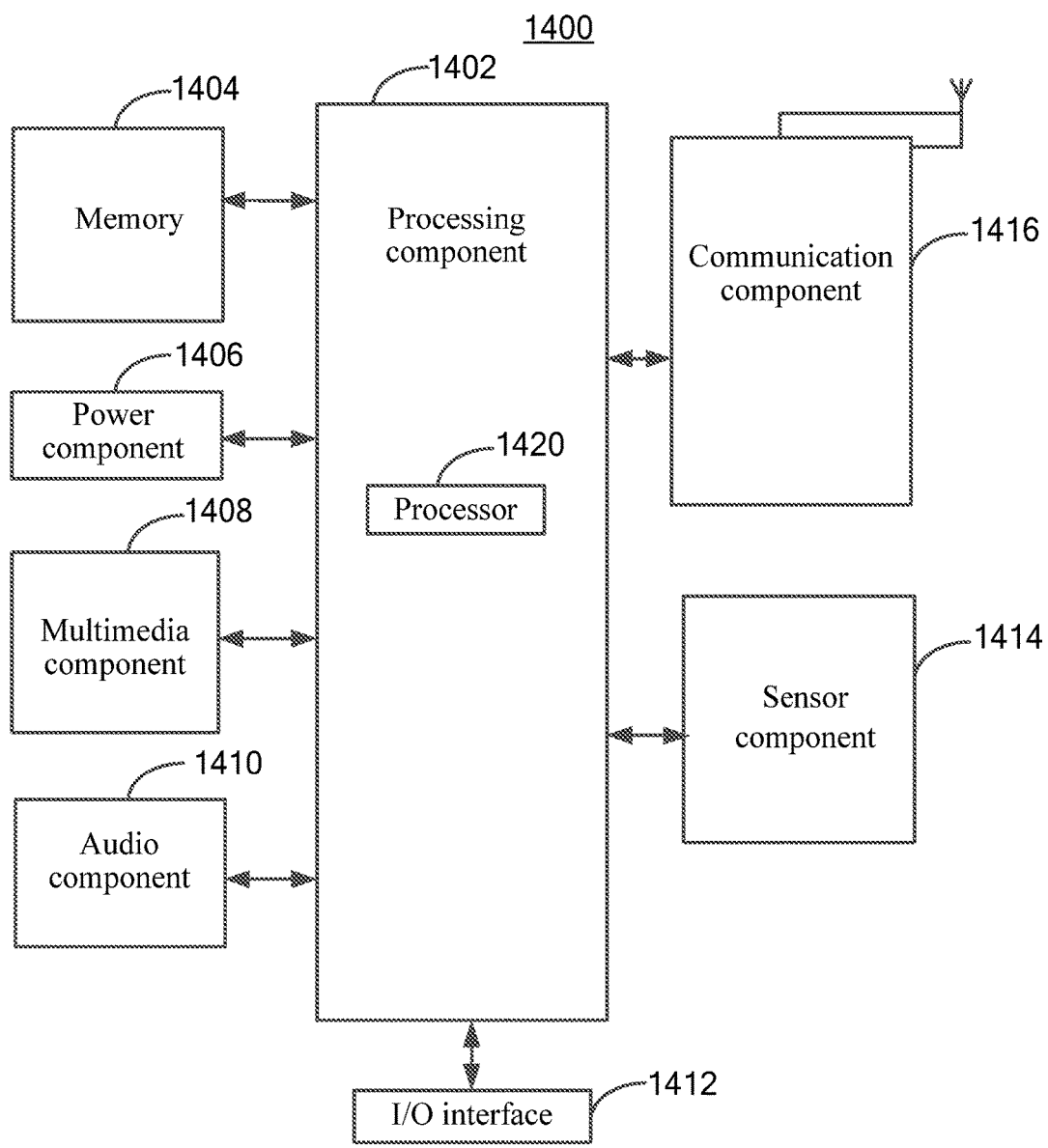
FIG. 13 is a block diagram showing a first terminal device according to an exemplary embodiment of the present disclosure.

As shown in FIG. 13, FIG. 13 is a block diagram showing a first terminal device 1400 according to an exemplary embodiment of the present disclosure. For example, the device 1400 may be a mobile phone, a computer, a digital broadcast terminal device, a messaging device, a smart air conditioner, a smart air purifier, a smart socket, a gaming console, a tablet, a medical device, exercise equipment, a personal digital assistant (PDA), or the like, which may have a routing function.

Referring to FIG. 13, the device 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 usually controls overall operations of the device 1400, such as the operations associated with display, telephone calls, data communications, camera operations, and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For instance, the processing component 1402 may include a multimedia module to facilitate the interaction between the multimedia component 1408 and the processing component 1402.

The memory 1404 is configured to store various types of data to support the operation of the device 1400. Examples of such data include instructions for any application or method operated on the device 1400, contact data, phonebook data, messages, pictures, videos, etc. The memory 1404 may be implemented using any type of volatile or non-volatile memory device or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the device 1400. The power component 1406 may include a power management system, one or more power sources, and other components associated with the generation, management, and distribution of power in the device 1400.

The multimedia component 1408 includes a screen providing an output interface between the device 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 1408 includes a front camera and/or a rear camera. The front camera and/or the rear camera may receive an external multimedia datum while the device 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a microphone (MIC) configured to receive an external audio signal when the device 1400 is in an operation mode, such as a call mode, a recording mode, and a voice identification mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, a button, or the like. The button may include, but not limited to, a home button, a volume button, a starting button, and a locking button.

The sensor component 1414 includes one or more sensors to provide status assessments of various aspects of the device 1400. For instance, the sensor component 1414 may detect an open/closed status of the device 1400, relative positioning of components, e.g., the display and the keyboard, of the device 1400, a change in position of the device 1400 or a component of the device 1400, a presence or absence of user contact with the device 1400, an orientation or an acceleration/deceleration of the device 1400, and a change in temperature of the device 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate communication, wired or wirelessly, between the device 1400 and other devices. The device 1400 may access a wireless network based on a communication standard, such as WIFI, 2G, or 3G, or a combination thereof. In one exemplary embodiment, the communication component 1416 receives a broadcast signal or broadcast associated information from an external broadcast management system via a broadcast channel. In one exemplary embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above method.

In exemplary embodiments, there exists also provided a non-transitory computer readable storage medium including instructions, such as included in the memory 1404, executable by the processor in the device 1400, for performing the above method. For example, the non-transitory computer-readable storage medium may be a ROM, a random access memory (RAM), a CD-ROM, a magnetic tape, a floppy disc, an optical data storage device, or the like.

Figure 14:
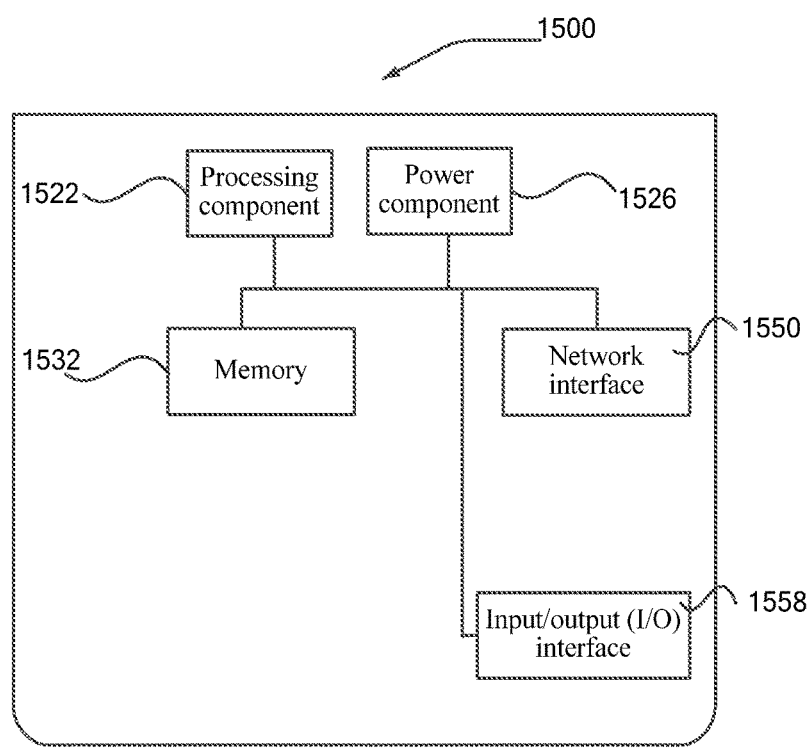
FIG. 14 is a block diagram showing a target terminal device according to an exemplary embodiment of the present disclosure.

As shown in FIG. 14, FIG. 14 is a block diagram showing a target terminal device 1500 according to an exemplary embodiment of the present disclosure. For example, the device 1500 may be provided as a routing device. Referring to FIG. 14, the device 1500 includes a processing component 1522 that further includes one or more processors, and memory resources represented by a memory 1532 for storing instructions, such as application programs, executable by the processing component 1522. The application programs stored in memory 1532 may include one or more modules, each of which corresponds to a set of instructions. Moreover, the processing component 1522 is configured to execute instructions for performing the above described method for processing communication identification.

The device 1500 may also include a power component 1526 configured to perform power management of the device 1500, wired or wireless network interface(s) 1550 configured to connect the device 1500 to a network, and an input/output (I/O) interface 1558. The device 1500 may operate based on an operating system stored in the memory 1532, such as Windows Server™, Mac OS X™, Unix™, Linux™, FreeBSD™, or the like.

After considering this description and carrying out the embodiments disclosed herein, those skilled in the art may easily anticipate other implementation aspects of the present disclosure. The present disclosure is meant to cover any variations, usage or adaptive change of these embodiments, and these variations, usage or adaptive change follow general concept of the present disclosure and include the common knowledge or the customary technical means in the technical field that is not disclosed in the present disclosure.

The description and embodiments are only exemplary, and the real range and spirit of the present disclosure are defined by the following claims.

It should be understood that the present disclosure is not limited to precise structures that are described above and shown in the accompanying drawings, and may be modified and changed without departing from the range of the present disclosure. The scope of the present disclosure is only defined by the appended claims.

What is claimed is:

1. A method of enabling a target terminal device to access a target wireless network provided by a wireless AP (Access Point) device, the method applied to a first terminal device and comprising:
    accessing the target wireless network;
    receiving at least one beacon packet broadcasted by a second terminal device in an AP mode in a preset time period by calling a wireless AP scan interface, wherein the beacon packet carries terminal device information of the second terminal device;
    acquiring the target terminal device from the second terminal device in the AP mode according to the terminal device information, wherein acquiring the target terminal device from the second terminal device in the AP mode according to the terminal device information comprises:
        sending a verification packet to the second terminal device in the AP mode according to the terminal device information;
        receiving a response packet of the verification packet from the second terminal device;
        detecting a recorded history terminal device list according to the terminal device information of the second terminal device which sends the response packet, wherein the recorded history terminal device list contains terminal device information of a terminal device found by the first terminal device previously and accesses the target wireless network; and
        determining the second terminal device corresponding to the terminal device information found from the history terminal device information as the target terminal device;
    encrypting the access information of the target wireless network to acquire an encrypted character string, wherein the access information comprises a service set identifier SSID and a password of the target wireless network;
    constructing a plurality of destination media access control MAC addresses according to the encrypted character string, wherein the destination MAC address is used to carry information of the encrypted character string;
    generating a plurality of multicast addresses for the plurality of destination MAC addresses according to a mapping relationship between the MAC address and the multicast address; and
    sending a multicast packet to each of the plurality of multicast addresses, wherein the multicast packet is indicative of the access information and is received by the target terminal device so as to access the target wireless network.

2. The method according to claim 1, wherein acquiring the target terminal device from the second terminal device according to the terminal device information comprises:
    outputting an information list containing the terminal device information of the second terminal device; and
    obtaining target terminal device information selected by a user from the information list, wherein the target terminal device information is the terminal device information of the target terminal device.

3. The method according to claim 1, wherein acquiring the target terminal device from the second terminal device according to the terminal device information comprises:
    determining whether a current time satisfies a preset time condition;
    detecting a preset target terminal device list according to the terminal device information of the second terminal device when the time condition is satisfied, wherein the target terminal device list contains terminal device information of a terminal device permitted to access the target wireless network under the time condition; and
    determining the second terminal device corresponding to the terminal device information found from the target terminal device list as the target terminal device.

4. The method according to claim 1, wherein constructing a plurality of destination MAC addresses according to the encrypted character string comprises:
    acquiring a byte content of a byte composing the encrypted character string sequentially; and
    constructing a destination MAC address for the byte content, wherein, the byte content is written in a value byte of the destination MAC address writes, and location information of the byte content in the encrypted character string is written in an index byte of the destination MAC address.

5. A method of accessing a target wireless network provided by a wireless AP device, the method applied to a target terminal device and comprising:
    broadcasting a beacon packet in a preset time period, wherein the beacon packet carries terminal device information of a second terminal device in an AP mode;
    receiving a verification packet from a first terminal, wherein the first terminal sends the verification packet to the second terminal device in the AP mode according to the terminal device information;
    sending a response packet to the first terminal, so that the first terminal device:
        detects a recorded history terminal device list according to the terminal device information of a second terminal device which sends the response packet, wherein the recorded history terminal device list contains terminal device information of a terminal device found by the first terminal device previously and accesses the target wireless network; and
        determines a second terminal device corresponding to the terminal device information found from the history terminal device information as the target terminal device;
    receiving a physical layer packet carrying a multicast packet sent from a first terminal device that has accessed a target wireless network, wherein a multicast address of the multicast packet is one of a plurality of multicast addresses constructed by the first terminal device according to access information of the target wireless network;
    acquiring a MAC address of the physical layer packet;
    acquiring a data area in the MAC address corresponding to the multicast address sent from the first terminal device according to a mapping relationship between the MAC address and the multicast address;
    reading a value byte in the data area of the MAC address to obtain a byte content, and reading an index byte in the data area of the MAC address to obtain location
information of the byte content;
combining the byte content according to the location
information to obtain an encrypted character string; and
decoding the encrypted character string to obtain a SSID
and a password of the target wireless network as the
access information; and
accessing the target wireless network according to the
access information.

6. The method according to claim 5, wherein receiving the physical layer packet carrying the multicast packet sent from the first terminal device that has accessed the target wireless network comprises:
starting a listening mode; and
receiving the physical layer packet carrying a multicast packet sent from the first terminal device in the listening mode.

7. A first terminal device, comprising:
a processor; and
a memory for storing instructions executable by the processor;
wherein the processor is configured to perform:
accessing a target wireless network provided by a wireless AP device;
receiving at least one beacon packet broadcasted by a second terminal device in an AP mode in a preset time period by calling a wireless AP scan interface, wherein the beacon packet carries terminal device information of the second terminal device;
acquiring a target terminal device from the second terminal device in the AP mode according to the terminal device information, wherein acquiring the target terminal device from the second terminal device in the AP mode according to the terminal device information comprises:
sending a verification packet to the second terminal device in the AP mode according to the terminal device information;
receiving a response packet of the verification packet from the second terminal device;
detecting a recorded history terminal device list according to the terminal device information of the second terminal device which sends the response packet, wherein the recorded history terminal device list contains terminal device information of a terminal device found by the first terminal device previously and accesses the target wireless network; and
determining the second terminal device corresponding to the terminal device information found from the history terminal device information as the target terminal device;
encrypting the access information of the target wireless network to acquire an encrypted character string, wherein the access information comprises a service set identifier SSID and a password of the target wireless network;
constructing a plurality of destination media access control MAC addresses according to the encrypted character string, wherein the destination MAC address is used to carry information of the encrypted character string;
generating a plurality of multicast addresses for the plurality of destination MAC addresses according to a mapping relationship between the MAC address and the multicast address; and
sending a multicast packet to each of the plurality of multicast addresses, wherein the multicast packet is indicative of the access information and is received by the target terminal device so as to access the target wireless network.

8. The first terminal device according to claim 7, wherein acquiring the target terminal device from the second terminal device according to the terminal device information comprises:
outputting an information list containing the terminal device information of the second terminal device; and
obtaining target terminal device information selected by a user from the information list, wherein the target terminal device information is the terminal device information of the target terminal device.

9. The first terminal device according to claim 7, wherein acquiring the target terminal device from the second terminal device according to the terminal device information comprises:
determining whether a current time satisfies a preset time condition;
detecting a preset target terminal device list according to the terminal device information of the second terminal device when the time condition is satisfied, wherein the target terminal device list contains terminal device information of a terminal device permitted to access the target wireless network under the time condition; and
determining the second terminal device corresponding to the terminal device information found from the target terminal device list as the target terminal device.

10. The first terminal device according to claim 7, wherein constructing a plurality of destination MAC addresses according to the encrypted character string comprises:
acquiring a byte content of a byte composing the encrypted character string sequentially; and
constructing a destination MAC address for the byte content, wherein, the byte content is written in a value byte of the destination MAC address writes, and location information of the byte content in the encrypted character string is written in an index byte of the destination MAC address.

11. A target terminal device, comprising:
a processor; and
a memory for storing instructions executable by the processor;
wherein the processor is configured to perform:
broadcasting a beacon packet in a preset time period, wherein the beacon packet carries terminal device information of a second terminal device in an AP mode;
receiving a verification packet from a first terminal, wherein the first terminal sends the verification packet to the second terminal device in the AP mode according to the terminal device information;
sending a response packet to the first terminal, so that the first terminal device:
detects a recorded history terminal device list according to the terminal device information of a second terminal device which sends the response packet, wherein the recorded history terminal device list contains terminal device information of a terminal device found by the first terminal device previously and accesses the target wireless network; and
determines a second terminal device corresponding to the terminal device information found from the history terminal device information as the target terminal device;
receiving a physical layer packet carrying a multicast packet sent from a first terminal device that has accessed a target wireless network, wherein a multicast address of the multicast packet is one of a plurality of multicast addresses constructed by the first terminal device according to access information of the target wireless network;

acquiring a MAC address of the physical layer packet;

acquiring a data area in the MAC address corresponding to the multicast address sent from the first terminal device according to a mapping relationship between the MAC address and the multicast address;

reading a value byte in the data area of the MAC address to obtain a byte content, and reading an index byte in the data area of the MAC address to obtain location information of the byte content;

combining the byte content according to the location information to obtain an encrypted character string; and decoding the encrypted character string to obtain a SSID and a password of the target wireless network as the access information; and accessing the target wireless network according to the access information.

12. The target terminal device according to claim 11, wherein receiving the physical layer packet carrying the multicast packet sent from the first terminal device that has accessed the target wireless network comprises:

starting a listening mode; and receiving the physical layer packet carrying a multicast packet sent from the first terminal device in the listening mode.

* * * * *